United States Patent [19]

Sasaki et al.

[11] Patent Number: 5,144,213
[45] Date of Patent: Sep. 1, 1992

[54] BRAKE CONTROL METHOD OF GRAVITY AXIS

[75] Inventors: Takao Sasaki, Hachioji; Kunihiko Murakami, Hino; Masahiko Hosokawa, Minamitsuru, all of Japan

[73] Assignee: Fanuc Ltd, Minamitsuru, Japan

[21] Appl. No.: 548,986

[22] PCT Filed: Nov. 16, 1989

[86] PCT No.: PCT/JP89/01165
§ 371 Date: Jul. 17, 1990
§ 102(e) Date: Jul. 17, 1990

[87] PCT Pub. No.: WO90/07737
PCT Pub. Date: Jul. 12, 1990

[30] Foreign Application Priority Data
Dec. 28, 1988 [JP] Japan ................ 63-334880

[51] Int. Cl.[5] .................... G05B 19/18
[52] U.S. Cl. .................... 318/569; 318/571; 318/593
[58] Field of Search .................... 318/568-646; 901/3, 9, 12-23; 364/513

[56] References Cited

U.S. PATENT DOCUMENTS

| | | | |
|---|---|---|---|
| 3,806,788 | 4/1974 | Ullmann et al. | 318/601 |
| 4,506,321 | 3/1985 | Comstock et al. | 318/571 |
| 4,514,677 | 4/1985 | Kaufman III et al. | 318/759 |
| 4,602,195 | 7/1986 | Eberle et al. | 318/568 |
| 4,794,311 | 12/1988 | Kiya et al. | 318/569 |
| 4,928,047 | 5/1990 | Arai et al. | 318/568.16 |

Primary Examiner—Paul Ip
Attorney, Agent, or Firm—Staas & Halsey

[57] ABSTRACT

A gravity axis brake control method of controlling the brake of the gravity axis of a computerized numerical controlled machine tool, wherein a computerized numerical control (CNC) notifies a programmable controller (PC) that the control of the gravity axis will be interrupted (Step S1), the PC outputs a signal for actuating the brake at the machine tool (step S3), and the CNC turns off an exciting current of a servo motor after a preset brake operation completion time has passed (step S7). The preset time is longer than the time after that at which the CNC notifies the PC to interrupt the control of the servo motor as compared to the time at which the brake locks the gravity axis.

3 Claims, 2 Drawing Sheets

BRAKE CONTROL METHOD OF GRAVITY AXIS

BACKGROUND OF THE INVENTION

1. Field of the Invention

The present invention relates to a gravity axis control method of a computerized numerically controlled machine tool, and more specifically, to a gravity axis brake control method of preventing an accidental detaching of a tool mounted on a gravity axis.

2. Description of the Related Art

In general, the Z axis of a vertical type machining center and the Y axis of a horizontal type machining center are referred to as a gravity axis and a tool mounted thereon becomes detached when a power supply is turned off or the excitation of a servo motor of the gravity axis is stopped. This unwanted detaching can be prevented by providing a mechanical brake which is actuated when the power supply is turned off. This brake is generally arranged to clamp the servomotor of the gravity axis when a current supplied to the brake is turned off.

In case of an emergency stop, a programmable controller (hereinafter, referred to as a PC) is notified that the control of the servo motor will be interrupted, whereupon the control of the servo motor is immediately interrupted and an exciting current supplied to the servo motor is turned off. At this time, the PC outputs a signal turning off the current to the brake, to cause the brake to lock the gravity axis.

Nevertheless, since the time at which a computerized numerical control (hereinafter referred to as CNC), interrupts the control of the servo motor and turns off the exciting current supplied to the servo motor of the gravity axis is not synchronized with the time at which the current supplied to the brake is turned off in response to the signal from the PC, thereby locking the gravity axis the tool on the gravity axis may be detached therefrom or the gravity axis may be subjected to shock.

SUMMARY OF THE INVENTION

It is an object of the present invention is to provide a gravity axis brake control method of preventing an unwanted detaching of a tool mounted on a gravity axis.

The present invention achieves the above object by providing a gravity axis brake control method of controlling the brake of the gravity axis of a CNC machine tool, comprising the steps of outputting a signal from the CNC to the PC to notify that the control of the gravity axis will be interrupted, outputting a signal from the PC to the machine tool for actuating the brake, and causing the CNC to turn off an exciting current of the servo motor after a preset brake operation completion time has passed.

First, the CNC notifies the PC that the control of the servo motor will be interrupted and the exciting current supplied to the servo motor will be turned off. The PC receives the signal and turns off a current supplied to the brake, and accordingly, the brake locks the gravity axis. Further, the CNC turns off the exciting current supplied to the servo motor after a preset time has elapsed. This preset time is slightly longer than the time from that at which the CNC notifies the PC to interrupt the control of the servo motor as compared to the time at which the brake locks the gravity axis.

DESCRIPTION OF THE PREFERRED EMBODIMENT

An embodiment of the present invention will be described below with reference to drawings.

Figure 1:
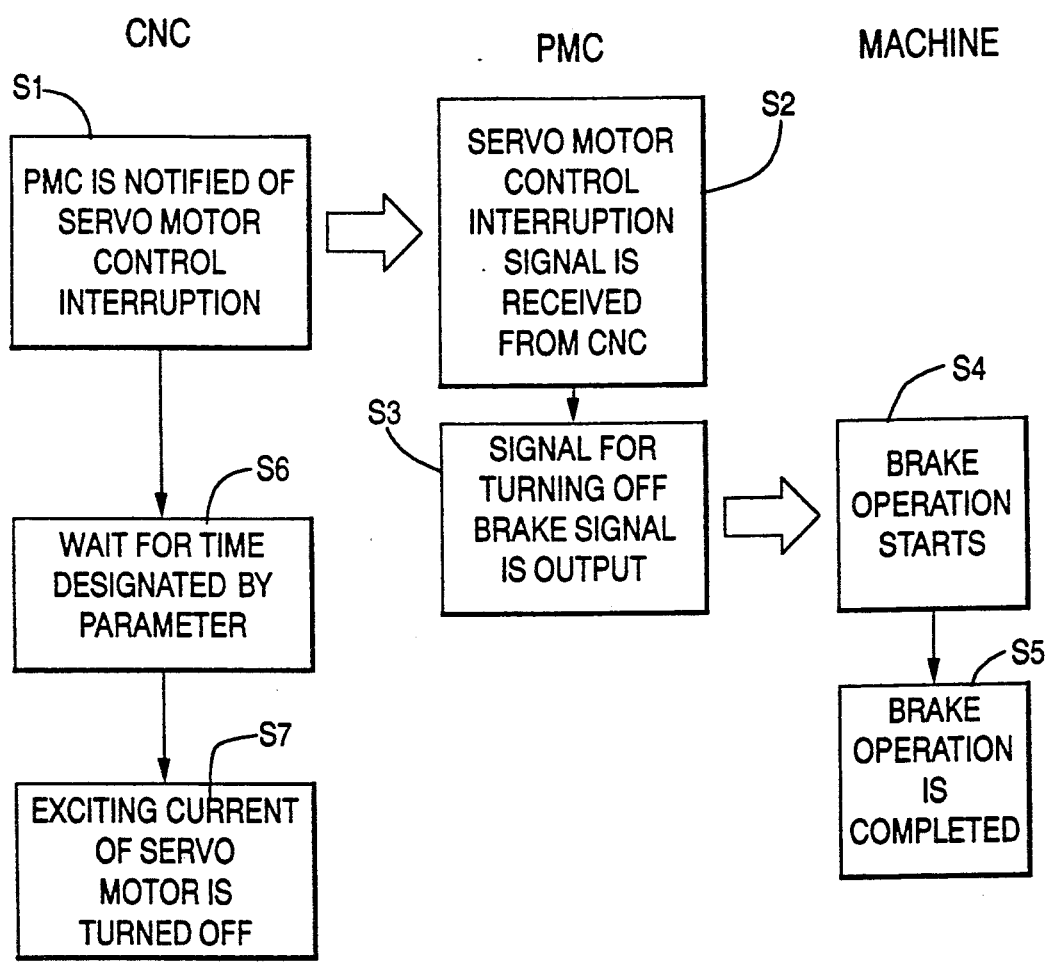
FIG. 1 is an execution flows diagram of a gravity axis brake control method according to the present invention.

FIG. 1 is a conceptual view of a gravity axis brake control method according to the present invention. The control flow will be described with respect to respective steps. In the figure, numerals prefixed with an "S" indicate the numbers of the steps of the process.

At step S1, the CNC receives an emergency stop signal or the like and notifies a programmable machine controller (hereinafter, referred to as a PMC) that the control of the servo motor of a gravity axis will be interrupted, i.e., an exciting current supplied to the servo motor will be turned off, and at step S2, the PMC receives a signal from the CNC that an exciting current of the servo motor will be turned off. Then, at step S3, a signal for turning off a brake current is applied to the driver of a machine tool, and, at step S4, the driver of the machine tool turns off the brake current to start the operation of the brake. At step S5, the operation of the brake is completed and the gravity axis is locked. At step S6, the CNC controls the servo motor of the gravity axis and holds the exciting current for a preset time. Then, at step S7, the exciting current of the servo motor is turned off after a preset time designated by a parameter has passed. Note, the time set by the parameter is slightly longer than that from the time at which the PMC receives the notification that the control of the servo motor will be interrupted and outputs the signal for turning off the brake current as compared to the time at which the brake locks the gravity axis.

Figure 2:
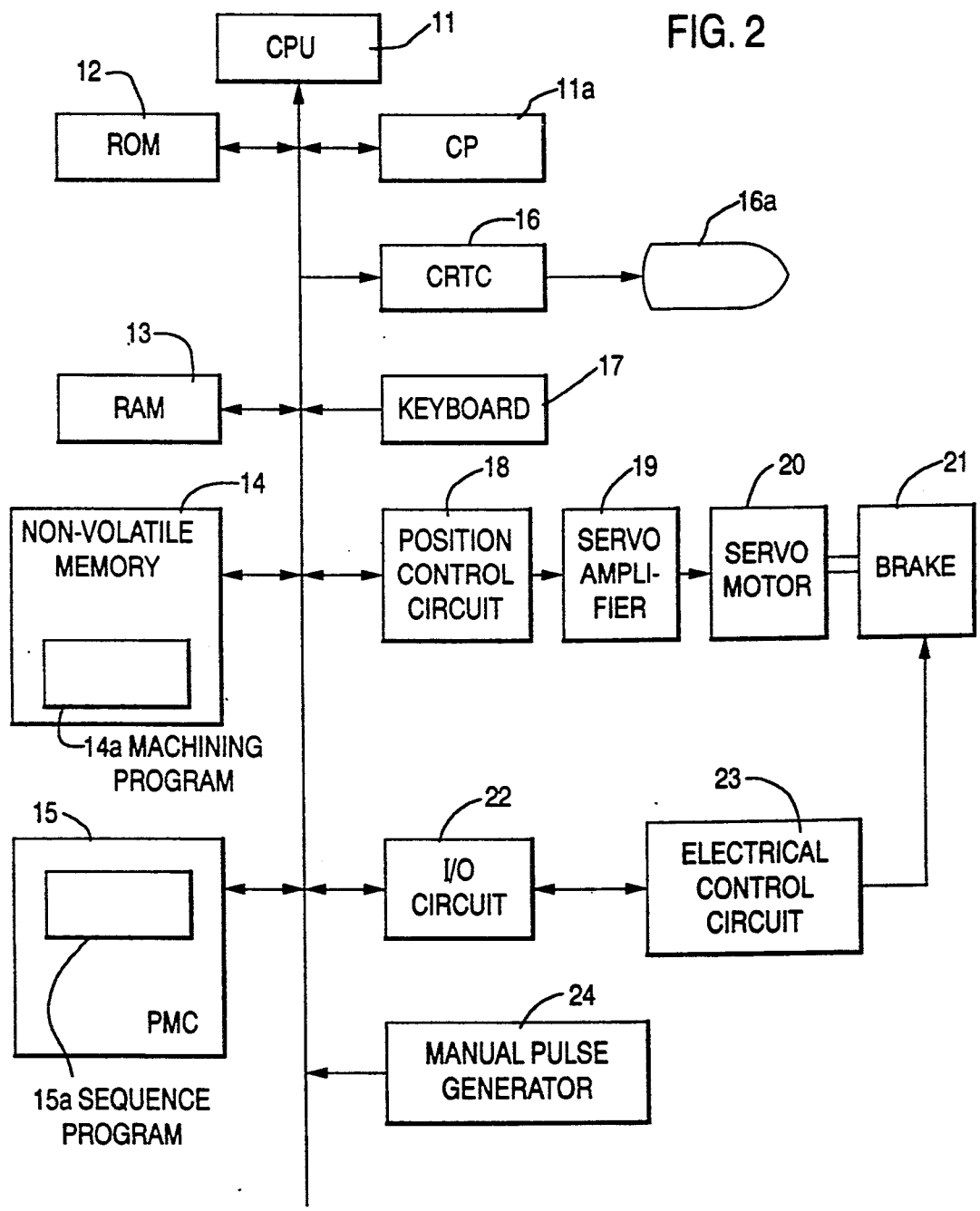
FIG. 2 is a diagram of a hardware arrangement for carrying out the present invention.

Next, the hardware for carrying out the present invention will be described. FIG. 2 is a diagram of a hardware arrangement for carrying out the present invention, wherein a processor 11 controls the method as a whole in accordance with a control program stored in a ROM 12. A coprocessor 11a executed calculations, such as transformations of the coordinate method, trigonometric functions and the like, at a high speed in response to a command from the processor 11. A RAM 13 stores various calculation data. A non-volatile memory 14 composed of a CMOS or the like backed up by a battery stores a machining program 14a, and parameters. A PMC 15 receives a signal for interrupting the control of a servo motor from the processor 11 and outputs a signal for turning off a brake current, in accordance with the controls executed by a sequence program 15a. A display control circuit 16 converts a digital signal to a display signal. A display unit 16a composed of a CRT, or a liquid crystal display or the like receives the display signal and displays a machining program and coordinate positions. A keyboard 17 is used to input various data. A position control circuit 18 controls the servo motor 20 and a servo amplifier 19 receives a command from the position control circuit 18 and drives the servo motor 20. A brake 21 is associated with the servo motor 20 whereby, when a power supply is turned off or an exciting current of the servo motor is turned off, the servo motor 20 is locked by the brake 21 to prevent an unwanted detaching of a tool or the like mounted on the gravity axis. A position sensor, such as a tachometer generator, pulse coder, optical scale or the like (not shown in the figure) is associated with the servo motor, to feed back the speed thereof. Although these elements are provided for a number of axes, except the brake, the elements for only one axis of the gravity axis are shown in the figure, as the respective axes are similarly arranged.

An I/O circuit 22 receives a signal from the PMC 15 for turning off a brake current and supplies same to an electrical control circuit 23. The electrical control circuit 23 turns off the current of the brake 21, whereby the brake 21 locks the axis of the servo motor 20. A manual pulse generator 24 contained in a machine control panel is used to move the respective axes digitally.

Although only one processor is shown here, a multi-processor method in which a plurality of processors are used can be arranged in accordance with need.

Further, although the PMC contained in the CNC serves as a programmable controller in the above description, an independent type PC provided externally of the CNC can be used to control the brake in a similar way.

Furthermore, although the brake is described as an arrangement for locking the servo motor, it may be arranged to lock the ball screw of the gravity axis.

As described above, according to the present invention, since the CNC outputs the signal for turning off the exciting current of the servo motor, so that the exciting current of the servo motor is turned off after the brake has locked the gravity axis, an unwanted detaching of a tool or the like mounted on the gravity shaft, or a shock applied thereto, can be prevented.

We claim:

1. A gravity axis brake control method of controlling the brake of the gravity axis of a computerized numerically controlled machine tool, comprising the steps of:

causing a computerized numerical control to notify a programmable controller at a first time that the control of a servo motor of said gravity axis will be interrupted;

outputting a signal from said programmable controller to said machine tool for actuating said brake to lock the gravity axis by a second time; and causing said computerized numerical control to turn off an exciting current of said servo motor after a preset brake operation completion period, at least as long as the difference between the first and second times, has passed since the first time.

2. A gravity axis brake control method according to claim 1, wherein said preset brake operation completion time is set by a parameter.

3. A gravity axis brake control method according to claim 1, wherein said programmable controller is a programmable machine controller contained in said computerized numerical control.

* * * * *

UNITED STATES PATENT AND TRADEMARK OFFICE
CERTIFICATE OF CORRECTION

PATENT NO. : 5,144,213

DATED : September 1, 1992

INVENTOR(S) : Sasaki et al.

It is certified that error appears in the above-identified patent and that said Letters Patent is hereby corrected as shown below:

TITLE PAGE [86], line 2 (§ 371 Date:), "Jul. 17, 1990" should be --Jul. 30, 1990--;

line 3 (§ 102(e) Date:), "Jul. 17, 1990" should be --Jul. 30, 1990.

Col. 1, line 39, "axis" should be --axis,--.

Col. 2, line 3, "flows" should be --flow--.

line 46, "executed" should be --executes--.

Signed and Sealed this

Ninth Day of November, 1993

Attest:

BRUCE LEHMAN

Attesting Officer      Commissioner of Patents and Trademarks